United States Patent [19]
Alcorn

[11] Patent Number: 6,157,395
[45] Date of Patent: Dec. 5, 2000

[54] SYNCHRONIZATION OF FRAME BUFFER SWAPPING IN MULTI-PIPELINE COMPUTER GRAPHICS DISPLAY SYSTEMS

[75] Inventor: Byron A Alcorn, Ft Collins, Colo.

[73] Assignee: Hewlett-Packard Company, Palo Alto, Calif.

[21] Appl. No.: 08/859,799

[22] Filed: May 19, 1997

[51] Int. Cl.$^7$ ........................................... G06T 1/20
[52] U.S. Cl. ............................................ 345/506; 345/504
[58] Field of Search .................................. 345/502, 504, 345/508

[56] References Cited

U.S. PATENT DOCUMENTS

| | | | |
|---|---|---|---|
| 4,495,594 | 1/1985 | Eggebrecht et al. ................ | 364/900 |
| 4,523,226 | 6/1985 | Lipton et al. ........................ | 358/88 |
| 4,710,876 | 12/1987 | Cline et al. ......................... | 364/414 |
| 4,720,708 | 1/1988 | Takeda et al. ...................... | 340/814 |
| 4,760,388 | 7/1988 | Tatsumi et al. ..................... | 340/717 |
| 5,241,389 | 8/1993 | Bilbrey ............................... | 358/181 |
| 5,289,577 | 2/1994 | Gonzales et al. .................. | 345/506 |

(List continued on next page.)

FOREIGN PATENT DOCUMENTS

| | | | |
|---|---|---|---|
| 0416875A2 | 9/1990 | European Pat. Off. ........ | H04N 13/04 |
| 0734011A2 | 9/1996 | European Pat. Off. ......... | G09G 5/12 |
| 09319865A | 12/1997 | Japan . | |
| 2308284A | 6/1997 | United Kingdom ........... | H04N 13/00 |
| 2312122A | 10/1997 | United Kingdom ........... | H04N 13/00 |
| WO95/14252 | 5/1995 | WIPO ............................ | G02B 21/22 |

OTHER PUBLICATIONS

Lenny Lipton, "Stereo–Vision Formats For Video And Computer Graphics", Printed from http://www.sgi.com/Products/hardware/graphics/technology/graphics.html in Apr. 1997.

Silicon Graphics Promotional Literature, "Infinite Reality Graphics For Stunning Real–Time Interactivity". Printed from: http://www.sgi.com/Products/hardware/graphics/technology/graphics.html in Apr. 1997.

IEEE Transactions on Consumer Electronics, vol. 34, No. 3, Aug. 1988, pp. 536–542 "3–Dimensional Personal Computer System".

*Primary Examiner*—Matthew Luu
*Attorney, Agent, or Firm*—Kevin M. Hart

[57] ABSTRACT

Synchronization of frame buffer swapping among computer graphics pipelines in a multi-pipeline display system: The pipelines are arranged in a closed daisy chain loop. One pipeline is configured as master; the others are configured as slaves. The master swaps its frame buffers and propagates a master swap signal through the daisy chain. As each slave recognizes the signal, it swaps its own buffers. Each slave propagates a feedback signal back to the master to indicate whether the slave is ready to swap its buffers again. The master waits until the feedback signal indicates that all slaves are ready to swap their buffers before the master will swap its own buffers a second time. The process repeats when the master swaps its buffers a second time.

A first synchronization control system is coupled to a first pipeline and has a first daisy chain input and a first daisy chain output. A second synchronization control system is coupled to a second pipeline and has a second daisy chain input and a second daisy chain output. The first synchronization control system asserts the first daisy chain output when the first pipeline swaps its buffers and unasserts the first daisy chain output when the first pipeline is ready to swap its buffers again. The first synchronization control system indicates, when the first daisy chain input is asserted, to the first pipeline that it should not swap its buffers. The second synchronization control system indicates, when the second daisy chain input transitions from unasserted to asserted, to the second pipeline that it should swap its buffers. The second synchronization control system asserts the second daisy chain output whenever either the second pipeline is not ready to swap its frame buffers, or the second daisy chain input is asserted.

13 Claims, 4 Drawing Sheets

U.S. PATENT DOCUMENTS

| | | | |
|---|---|---|---|
| 5,416,510 | 5/1995 | Lipton et al. | 348/43 |
| 5,488,952 | 2/1996 | Schoolman | 178/660.07 |
| 5,493,595 | 2/1996 | Schoolman | 378/41 |
| 5,523,886 | 6/1996 | Johnson-Williams et al. | 359/464 |
| 5,572,250 | 11/1996 | Lipton et al. | 348/43 |
| 5,790,113 | 8/1998 | Perlman et al. | 345/213 |
| 5,794,016 | 8/1998 | Kelleher | 395/505 |
| 5,805,149 | 8/1998 | Yuki et al. | 345/202 |
| 5,805,913 | 9/1998 | Guttag et al. | 395/800 |
| 5,821,989 | 10/1998 | Lazzaro et al. | 348/56 |
| 5,894,312 | 4/1999 | Ishiwata et al. | 345/504 |

SYNCHRONIZATION OF FRAME BUFFER SWAPPING IN MULTI-PIPELINE COMPUTER GRAPHICS DISPLAY SYSTEMS

FIELD OF THE INVENTION

This invention relates generally to computer graphics display systems, and more particularly to methods and apparatus for synchronizing frame buffer swapping in multi-pipeline computer graphics display systems.

BACKGROUND

As the art of computer graphics has grown in sophistication, uses being made of computer graphics display systems have become increasingly various and creative. For example, in many modern applications, several display systems are employed at once to provide a larger viewing area than could be provided by a single display system operating alone. One such application is known popularly as a "virtual reality theater." In a typical virtual reality theater, multiple computer graphics display systems are used to project images on each of the walls of a room so that an observer within the room can see the images no matter in which direction he or she looks or moves. Often, the presentation of the images changes depending on the observer's position or orientation within the room as indicated by a tracking device. Other types of virtual reality theaters use multiple monitors oriented around a relatively stationary observer. The latter types of virtual reality theaters are frequently used, for example, in flight simulators. In advanced applications, stereoscopic display techniques are sometimes employed. In stereoscopic applications, left- and right-eye views are alternately displayed while special eyewear worn by the observer alternately occludes the right and left fields of vision. When the eyewear and the display system are synchronized properly, the observer is given the experience of having depth perception (i.e. "3D vision") while viewing the displayed scene.

Whether or not stereoscopic techniques are employed, special problems must be solved before using multi-display systems effectively in any of the above environments. One such special problem is that of synchronizing frame buffer swapping among the multiple display systems used to produce the images.

By way of background, a typical computer graphics "pipeline" 100 is depicted in FIG. 1. A host computer system 110 runs system and application software that is capable of modeling a scene in terms of polygon vertices, color, lighting, textures and so on. Host computer system 110 sends this information to graphics acceleration system 112. Graphics acceleration system 112 renders the modeled scene by generating pixel data for storage in a frame buffer memory. The contents of the frame buffer memory are continually read by a random access memory/digital-to-analog converter ("RAMDAC") module 122 which typically contains color or gamma correction lookup tables and drives a display monitor 124. In lower-end applications in which graphics acceleration system 112 is not present, host computer system 110 may generate the pixel data itself and write the pixel data into the frame buffer directly.

Also common is to use a technique known as double buffering. In double buffering, two frame buffers 116 and 118 are provided instead of a single frame buffer. In this manner, host computer system 110 or graphics acceleration system 112 can write pixel data into one frame buffer (the "non-viewable" or "back" buffer) while RAMDAC module 122 and monitor 124 display pixel data previously written into the other frame buffer (the "viewable" or "front" buffer). The effect of this technique is to reduce tearing and other unwanted visual artifacts that are introduced into an image when the contents of a frame buffer are changed while the contents of the same frame buffer are being displayed. In systems that use two buffers, it is known to use a frame buffer controller 114 to coordinate which buffer will be viewable and which will be non-viewable at any given moment. Specifically, a swap controller 120 within frame buffer controller 114 indicates when it is safe to stop displaying the contents of one frame buffer and to start displaying the contents of the other frame buffer. Typically, swap controller 120 will indicate that it is safe to swap frame buffers at the moment when (1) the graphics pipeline has finished rendering pixel data into the non-viewable buffer, and (2) the current raster position of the display is not within the window of interest. (In full-screen graphics, buffer swapping would normally occur only during a vertical retrace. In windowed graphics, however, buffer swapping might occur at any time when the raster is not within the window of interest.)

Although prior art frame buffer controller 114 and swap controller 120 are effective for timing the swapping of frame buffers 1 16 and 118 in a single computer graphics pipeline 100, they do not provide any mechanism for synchronizing the swapping of frame buffers among all of the graphics pipelines used in multi-pipeline display systems such as those described above. Therefore, discontinuities may be seen in the images produced by multi-pipeline display systems that use prior art frame buffer controllers 114 and swap controllers 120. This is because the various computer graphics pipelines in the multi-display system may swap buffers at different times if the complexities of the frames to be rendered differ significantly from one pipeline to another. This effect is especially noticeable, for example, if the pipelines are each displaying different parts of the same object. The unwanted visual effects caused by this lack of synchronization can be even more apparent when stereoscopic techniques are in use.

It is therefore an object of the present invention to provide a method and apparatus for synchronizing the swapping of frame buffers among all of the computer graphics pipelines in a multi-pipeline computer graphics display system.

SUMMARY OF THE INVENTION

The method and apparatus of the invention achieve this objective by arranging the computer graphics pipelines to be synchronized in a closed daisy chain loop. One of the pipelines in the loop is configured to be the master, and the others are configured to be slaves. When the master pipeline swaps its frame buffers, a master swap signal is propagated through the daisy chain loop from the master to each of the slaves. As each slave recognizes the master swap signal, its swaps its own frame buffers in response. In another aspect of the invention, each slave propagates a feedback signal over the daisy chain back to the master to indicate whether the slave is ready to swap its frame buffers again. If the latter technique is employed, then the master will wait until the feedback signal indicates that all slaves in the system are ready to swap their frame buffers before the master will swap its own frame buffers a second time. When the master swaps its frame buffers a second time, the process repeats with the master once again propagating the swap signal through the daisy chain.

In one embodiment, a multi-pipeline display system includes a closed daisy chain loop of synchronization control systems. The closed daisy chain loop of synchronization control systems includes a first synchronization control system coupled to a first computer graphics pipeline and a second synchronization control system coupled to a second computer graphics pipeline. The first synchronization control system is operable to assert its daisy chain output when the first computer graphics pipeline swaps its frame buffers, and to unassert its daisy chain output when the first computer graphics pipeline is ready to swap its frame buffers again. The first synchronization control system is also operable, during the time when its daisy chain input is asserted, to indicate to the first computer graphics pipeline that it should not swap its frame buffers. The second synchronization control system is operable, when it sees a positive edge on its daisy chain input, to indicate to the second computer graphics pipeline that it should swap its frame buffers. The second synchronization control system is also operable to assert its daisy chain output whenever either its daisy chain input is asserted or when the second computer graphics pipeline is not ready to swap its frame buffers.

Another aspect of the invention is the synchronization control system itself In one embodiment, the synchronization control system includes a daisy chain input; a daisy chain output; an AND gate; an OR gate; and a synchronization controller. The synchronization controller has programmable master/slave indicator circuitry for determining whether the synchronization control system will act as a slave or as a master with respect to other synchronization control systems; a master/slave output responsive to the programmable master/slave indicator circuitry; a daisy chain state input; a bus for interfacing the synchronization controller with a swap controller in a computer graphics pipeline; and a drawing output responsive to the bus for indicating whether the computer graphics pipeline is ready to swap its frame buffers. The daisy chain input is coupled to the daisy chain state input and to one input of the AND gate. The output of the OR gate is coupled to the daisy chain output. The drawing output is coupled to one input of the OR gate. The output of the AND gate is coupled to another input of the OR gate, and the master/slave output is coupled to another input of the AND gate so as to gate the daisy chain input to the OR gate when the synchronization control system is programmed as a slave, but to inhibit the daisy chain input from reaching the OR gate when the synchronization control system is programmed as a master.

DETAILED DESCRIPTION OF THE PREFERRED EMBODIMENTS

Figure 2:
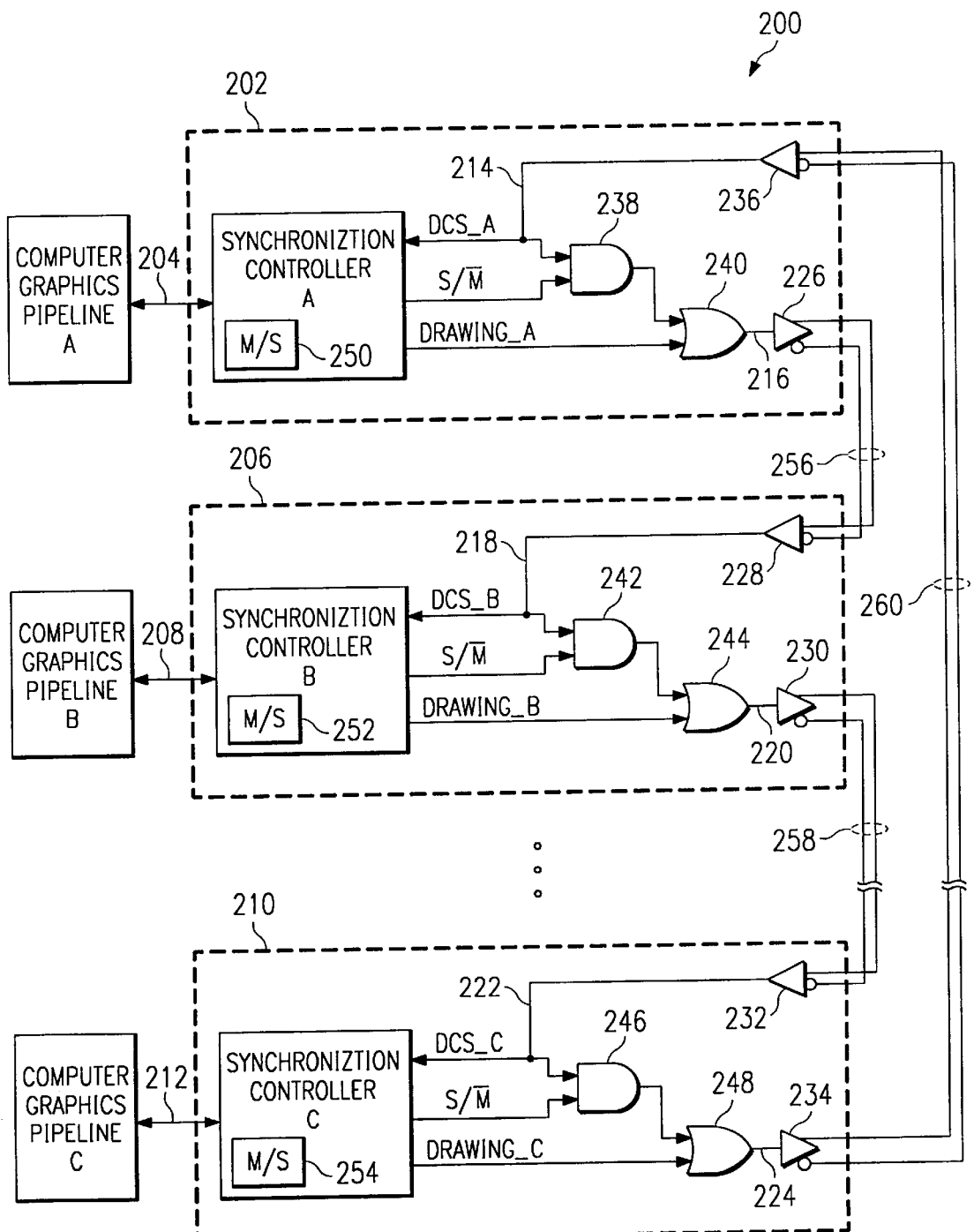
FIG. 2 is a logic diagram illustrating a multi-pipeline computer graphics display system according to a preferred embodiment of the invention.

FIG. 2 is a logic diagram illustrating a multi-pipeline computer graphics display system 200 according to a preferred embodiment of the invention. Computer graphics pipelines A, B and C may be conventional and may be implemented, for example, in accordance with computer graphics pipeline 100. Computer graphics pipelines A, B and C are coupled to synchronization control systems 202, 206 and 210 via buses 204, 208 and 212, respectively. Synchronization control system 202 has a daisy chain input 214 and a daisy chain output 216. Synchronization control system 206 has a daisy chain input 218 and a daisy chain output 220. Synchronization control system 210 has a daisy chain input 222 and a daisy chain output 224. Daisy chain output 216 is coupled to daisy chain input 218 via differential driver 226 and differential receiver 228. Daisy chain output 220 is coupled to daisy chain input 222 via differential driver 230 and differential receiver 232. Daisy chain output 224 is coupled to daisy chain input 214 via differential driver 234 and differential receiver 236. By virtue of this arrangement, synchronization control systems 202, 206 and 210 form a closed daisy chain loop.

Synchronization control system 202 contains synchronization controller A, AND gate 238 and OR gate 240. Synchronization control system 206 contains synchronization controller B, AND gate 242 and OR gate 244. Synchronization control system 210 contains synchronization controller C, AND gate 246 and OR gate 248. Synchronization controller A and AND gate 238 are coupled to daisy chain input 214 via signal line DCS_A. (The acronym DCS_A stands for "daisy chain state A.") Likewise, synchronization controller B and AND gate 242 are coupled to daisy chain input 218 via signal line DCS_B; and synchronization controller C and AND gate 246 are coupled to daisy chain input 222 via signal line DCS_C.

Synchronization controllers A, B and C may act independently either as masters or slaves. (Preferably, only one of the controllers will be configured as a master; the rest will be configured as slaves.) To accomplish this distinction, each controller contains programmable master/slave indicator circuitry shown in FIG. 2 at 250, 252 and 254. Each of the programmable master/slave indicator circuitry components may be implemented as a one-bit field in registers that are addressable and writeable via buses 204, 208 and 212, respectively. The state of the bit indicates whether the associated synchronization control system is to behave as a master or a slave. Each of synchronization controllers A, B and C has an output for indicating the state of this bit. These outputs are labeled S/$\overline{M}$ in FIG. 2 to indicate that, if the signal is asserted (unasserted), then the host synchronization control system is to act as slave (master). These outputs are coupled to one of the inputs of AND gates 238, 242 and 246, as shown. The outputs of AND gates 238, 242 and 246 are coupled to one of the inputs of OR gates 240, 244 and 248, respectively. The effect of this arrangement is to cause the state of the daisy chain input of each slave to contribute to the OR term generated by OR gates 240, 244 and 248. For a master, however, the daisy chain input does not contribute to the OR term.

The other input of OR gates 240, 244 and 248 is coupled to a DRAWING signal, which is asserted by the respective synchronization controller whenever its associated computer graphics pipeline is not yet ready to swap frame buffers. For example, this signal typically would be asserted if the associated computer graphics pipeline were busy rendering pixel data into its non-viewable frame buffer. The signal would be unasserted after the frame had been completely rendered into the non-viewable frame buffer. To accomplish this functionality, buses 204, 208 and 212 should be operable not only to allow the respective computer graphics pipelines A, B and C to access programmable master/slave indicator circuitry components 250, 252 and 254, but should also provide an interface to the respective swap controller 120 within the associated pipeline. More specifically, interface signaling should be provided to (1) allow the computer graphics pipeline to indicate to its synchronization controller when a frame buffer swap occurs, (2) allow the computer graphics pipeline to indicate to its synchronization controller when the pipeline is not yet ready to swap frame buffers, (3) allow the synchronization controller to indicate to its computer graphics pipeline when a frame buffer swap should occur, and (4) allow the synchronization controller to indicate to its computer graphics pipeline that a frame buffer swap should not be attempted. It is believed that a person having ordinary skill in the art and having reference to this description will be able to design such an interface without undue experimentation.

Figure 3:
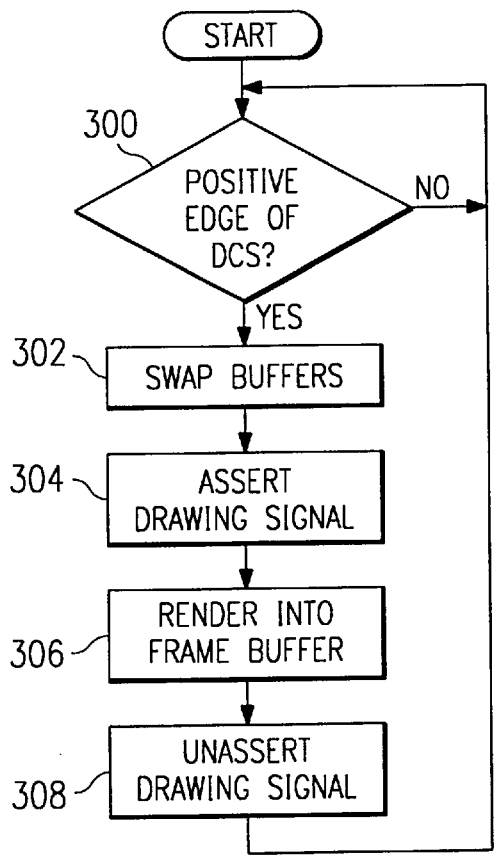
FIG. 3 is a flow diagram depicting a preferred behavioral description of each of the computer graphics pipelines of FIG. 2 that are configured as slaves.

FIG. 3 is a flow diagram illustrating behaviorally how a graphics pipeline and its associated synchronization controller will operate together when the synchronization controller is configured as a slave. As shown at 300, each slave monitors its daisy chain input and waits until it detects a positive edge. In other words, the slave waits until it detects that its daisy chain input has transitioned from an unasserted to an asserted state. While waiting, the slave synchronization control system indicates to its associated graphics pipeline that it is not yet appropriate to swap buffers. Upon detecting a positive edge, however, the synchronization control system indicates to its graphics pipeline that it is time to swap buffers, and the buffers are swapped at 302. As soon as this occurs, the slave synchronization control system asserts its DRAWING output as shown at 304 to indicate that its graphics pipeline is busy rendering pixel data into its non-viewable frame buffer. This signal remains asserted at 306 during the time it takes for the frame to be fully rendered. When the frame has been fully rendered, the slave synchronization control system unasserts its DRAWING output at 308 to indicate that it is ready to swap buffers. The slave then waits once again at 300 for a positive edge on its daisy chain input before it swaps buffers, and the process repeats.

Figure 4:
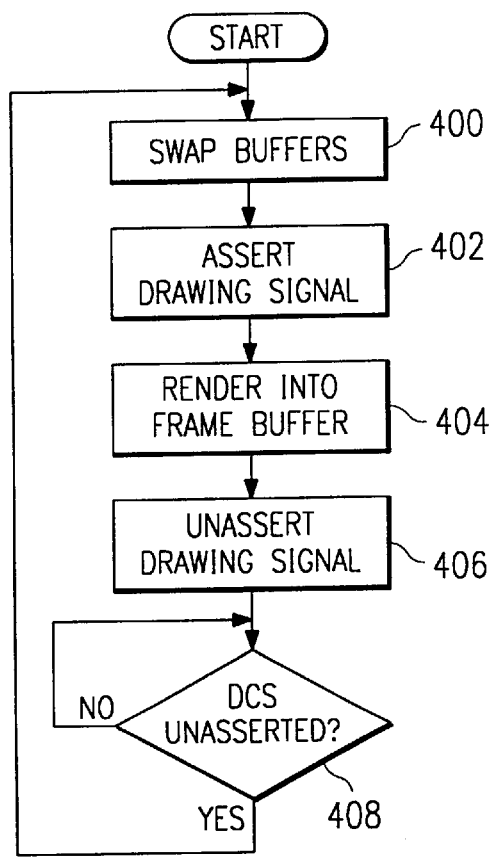
FIG. 4 is a flow diagram depicting a preferred behavioral description of the computer graphics pipeline of FIG. 2 that is configured as master.

FIG. 4 is a flow diagram illustrating behaviorally how a graphics pipeline and its associated synchronization controller will operate together when the synchronization controller is configured as a master. Assume the master computer pipeline swaps its frame buffers at 400. As soon as the associated master synchronization control system detects that this has occurred, it asserts its DRAWING output at 402 to indicate that the master pipeline is busy rendering pixel data into its non-viewable frame buffer. This signal remains asserted at 404 during the time it takes for the frame to be fully rendered. When the frame has been fully rendered, the master synchronization control system unasserts its DRAWING output at 406 to indicate that its associated graphics pipeline is ready to swap buffers again. The master synchronization controller will not indicate to its pipeline that it should swap buffers, however, until the master controller detects that its daisy chain input is in an unasserted state (indicating that all slaves are also ready to swap buffers). The master controller waits at 408 until it sees that its daisy chain input is unasserted, indicating that all slaves are ready to swap buffers, and then the master controller indicates to its associated graphics pipeline that it is safe to swap buffers. The process then repeats at 400 when the master pipeline swaps its frame buffers.

Figure 1:
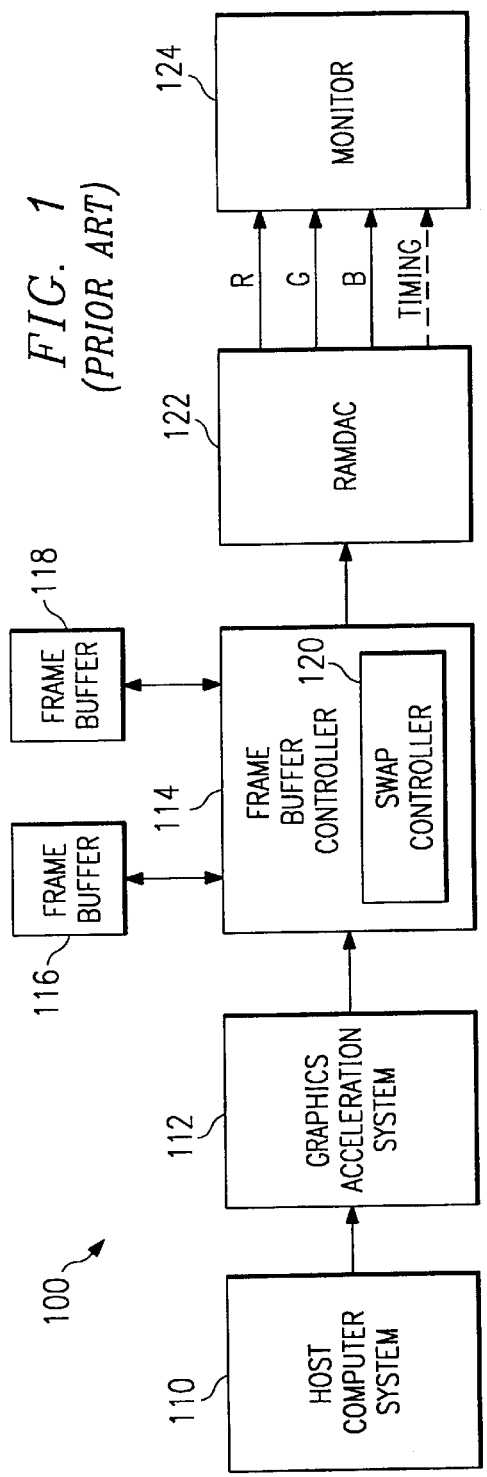
FIG. 1 is a block diagram illustrating a prior art computer graphics pipeline.
Figure 5:
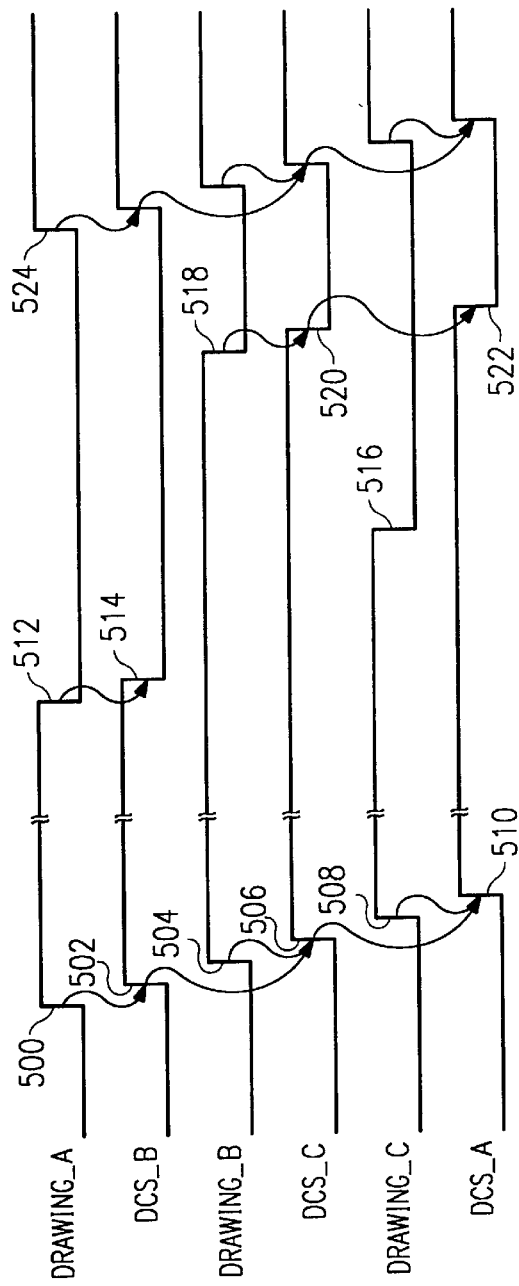
FIG. 5 is a timing diagram illustrating the operation of the multi-pipeline computer graphics display system of FIG. 2.

To provide a more detailed understanding of the operation of multi-pipeline computer graphics display system 200, an example will now be discussed in relation to the timing diagram of FIG. 5. For the sake of this example, assume that computer graphics pipeline A has accessed programmable master/slave indicator 250 and has stored a zero in the appropriate bit in order to configure synchronization control system 202 to act as the master. Assume also that computer graphics pipelines B and C have each accessed their respective programmable master/slave indicators 252, 254 and have stored a one in the appropriate bit in order to configure synchronization control systems 206, 210 to act as slaves. At 500, master pipeline A swaps it frame buffers and, in response, master synchronization controller A asserts DRAWING_A. This assertion is propagated through OR gate 240 and daisy chain link 256 to daisy chain input 218, causing DCS_B to be asserted as shown at 502. The positive edge on DCS_B causes slave synchronization controller B to tell computer graphics pipeline B to swap buffers and causes synchronization controller B to assert DRAWING_B, as shown at 504. Because synchronization controller B is configured as a slave, its S/$\overline{\text{M}}$ signal will be a one. Therefore, the assertion of DCS_B will be propagated through AND gate 242, OR gate 244 and daisy chain link 258 to daisy chain input 222. Also, the assertion of DRAWING_B will be propagated through OR gate 244 and daisy chain link 258 to daisy chain input 222, causing DCS_C to become asserted as shown at 506. In response to the positive edge on DCS_C, synchronization controller C tells pipeline C to swap buffers and asserts DRAWING_C, as shown at 508. This signal (as well as the DCS_C signal propagated through AND gate 246) is propagated through OR gate 248 and daisy chain link 260 to daisy chain input 214, causing DCS_A to become asserted, as shown at 510.

Assume that master pipeline A finishes rendering into its non-viewable frame buffer first. It then tells its synchronization controller A that it has finished rendering, and synchronization controller A, in response, unasserts DRAWING_A, as shown at 512. This propagates through OR gate 240 and daisy chain link 256 to cause DCS_B to become unasserted, as shown at 514. Assume that pipeline C finishes rendering second, and that pipeline B is the last to finish rendering. As soon as pipeline C is finished, it tells synchronization controller C, which unasserts DRAWING_C as shown at 516. Because pipeline B is still rendering, however, DRAWING_B remains asserted. So, even though DRAWING_C has become unasserted, master synchronization controller A still sees that DCS_A is asserted. This is because the asserted DRAWING_B signal is still being propagated through OR gate 244, daisy chain link 258, AND gate 246, OR gate 248 and daisy chain link 260 to daisy chain input 214. Thus, master synchronization controller A is still waiting to swap frame buffers, knowing that at least one slave in the daisy chain loop is still rendering and is not ready to swap its buffers.

Finally, at 518, pipeline B finishes rendering, and synchronization controller B unasserts DRAWING_B. This propagates through OR gate 244 and daisy chain link 258 to cause DCS_C to become unasserted, as shown at 520. As soon as the deassertion of DCS_C propagates through AND gate 246, OR gate 248 and daisy chain link 260, DCS_A becomes unasserted, as shown at 522. When master synchronization controller A sees that DCS_A has become unasserted, it indicates to master pipeline A that it is now safe to swap frame buffers. Master pipeline A does so, and the process repeats at 524. (Preferably, once master pipeline A learns that it is safe to swap frame buffers, it will only do so when the current raster position of its display is not within the window of interest. Moreover, each of the slave pipelines will observe the same caution with respect to their own current raster position.)

Figure 6:
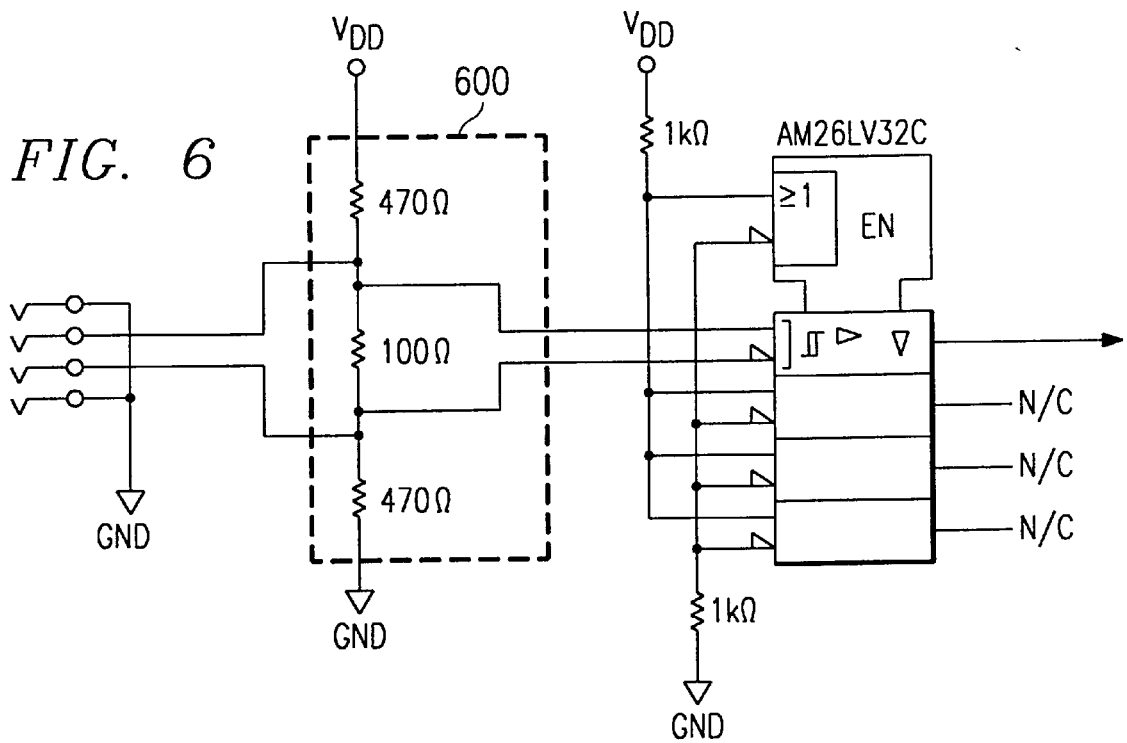
FIG. 6 is a schematic diagram illustrating a preferred implementation of the differential line receivers of FIG. 2.
Figure 7:
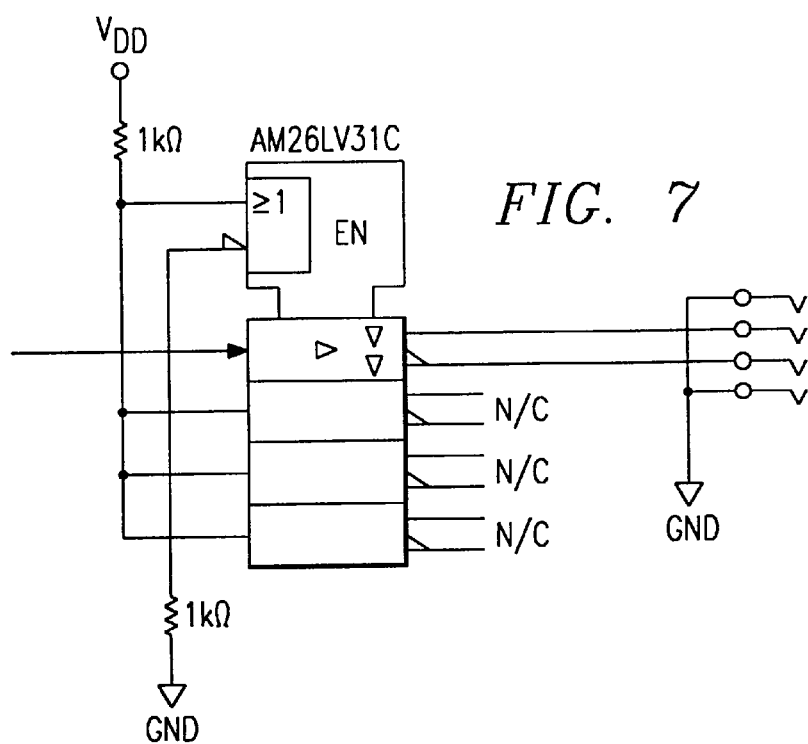
FIG. 7 is a schematic diagram illustrating a preferred implementation of the differential line drivers of FIG. 2.

FIG. 6 is a schematic diagram illustrating a preferred implementation of differential line receivers 228, 232 and 236. Any off-the-shelf differential line receiver may be used, such as the AM26LV32C quad differential line receiver shown, made by Texas Instruments, Inc. The resistor network shown at 600 is preferably used in order to provide a proper termination impedance for the daisy link chain. FIG. 7 is a schematic diagram illustrating a preferred implementation of differential line drivers 226, 230 and 234. As can be seen from the drawing, any off-the-shelf differential line driver may be used such as the AM26LV31C quad differential line driver shown, also made by Texas Instruments, Inc.

While the invention has been described in detail in relation to a particular embodiment thereof, this description is intended to be illustrative only. It will be obvious to those skilled in the art that many modifications can be made to the described embodiment without departing from the spirit and scope of the invention, and that such modifications will remain within the scope of the following claims.

What is claimed is:

1. Apparatus for synchronizing frame buffer swapping in at least first and second computer graphics pipelines, said apparatus for synchronizing frame buffer swapping comprising:

a closed daisy chain loop of synchronization control systems, each synchronization control system in said loop having a daisy chain input and a daisy chain output, the daisy chain output of each synchronization control system coupled to the daisy chain input of one other synchronization control system;

said closed daisy chain loop of synchronization control systems comprising:

a first synchronization control system coupled to said first computer graphics pipeline and having a first daisy chain input and a first daisy chain output; and a second synchronization control system coupled to said second computer graphics pipeline and having a second daisy chain input and a second daisy chain output;

wherein said first synchronization control system is operable to assert said first daisy chain output when said first computer graphics pipeline swaps its frame buffers and to unassert said first daisy chain output when said first computer graphics pipeline is ready to swap its frame buffers again;

wherein said first synchronization control system is operable, when said first daisy chain input is in an asserted state, to indicate to said first computer graphics pipeline that it should not swap its frame buffers;

wherein said second synchronization control system is operable, when said second daisy chain input transitions from an unasserted to an asserted state, to indicate to said second computer graphics pipeline that it should swap its frame buffers; and wherein said second synchronization control system is operable to assert said second daisy chain output whenever the logical OR of the following two conditions is true: said second computer graphics pipeline is not ready to swap its frame buffers, and said second daisy chain input is asserted.

2. Apparatus as recited in claim 1, wherein:

each of the synchronization control systems in said closed daisy chain loop is coupled to its own computer graphics pipeline;

wherein said first synchronization control system is a master;

wherein each of the other synchronization control systems in said closed daisy chain loop is a slave; and wherein each slave operates, with respect to said closed daisy chain loop and to its own computer graphics pipeline, in the same manner as said second synchronization control system operates with respect to said closed daisy chain loop and to said second computer graphics pipeline.

3. Apparatus as recited in claim 2, wherein each of said synchronization control systems in said closed daisy chain loop comprises:

a synchronization controller, an AND gate and an OR gate;

said synchronization controller having: programmable master/slave indicator circuitry for determining whether the synchronization control system will operate as master or as slave; a master/slave output responsive to said master/slave indicator circuitry; a daisy chain state input; and a drawing output, said drawing output for indicating that the computer graphics pipeline to which the synchronization control system is coupled is not ready to swap its buffers; and wherein: the daisy chain input of the synchronization control system is coupled to said daisy chain state input and to one input of said AND gate; the output of said OR gate is coupled to the daisy chain output of the synchronization control system; said drawing output is coupled to one input of said OR gate; the output of said AND gate is coupled to another input of said OR gate; and said master/slave output is coupled to another input of said AND gate so as to gate the daisy chain input of the synchronization control system to said OR gate when the synchronization control system is a slave, but to inhibit the daisy chain input of the synchronization control system from reaching said OR gate when the synchronization control system is a master.

4. A method of synchronizing frame buffer swapping in multi-pipeline computer graphics display systems, comprising the steps of:

a) swapping frame buffers in a master computer graphics pipeline;

b) propagating a master swap signal from said master computer graphics pipeline to a daisy chained series of slave computer graphics pipelines; and c) swapping frame buffers in each of said slave computer graphics pipelines in response to said master swap signal.

5. The method of claim 4, further comprising the steps of:

d) propagating a feedback signal from at least one of said slave computer graphics pipelines to said master computer graphics pipeline, said feedback signal for indicating whether said at least one slave computer graphics pipeline is ready to swap frame buffers;

e) waiting until said feedback signal indicates at said master computer graphics pipeline that said at least one slave computer graphics pipeline is ready to swap frame buffers; and repeating at step a).

6. The method of claim 4, further comprising the steps of:

accessing first master/slave indicator circuitry to configure said master computer graphics pipeline to operate as a master;

accessing at least second master/slave indicator circuitry to configure each of said slave computer graphics pipelines to operate as slaves; and determining the logical AND of master/slave indicator signal and a daisy chain input signal.

7. The method of claim 5, wherein said steps b) and d) comprise the steps of:

in at least one slave, determining the logical OR of the following two signals: a daisy chain input signal, and a drawing signal that indicates whether said at least one slave is ready to swap frame buffers; and driving a daisy chain output signal responsive to said determining step.

8. A synchronization control system for synchronizing frame buffer swapping in a first computer graphics pipeline with frame buffer swapping in a second computer graphics pipeline, said synchronization control system comprising:

a daisy chain input;

a daisy chain output;

an AND gate;

an OR gate; and a synchronization controller having: programmable master/slave indicator circuitry for determining whether said synchronization control system will act as a slave or as a master with respect to said second computer graphics pipeline; a master/slave output responsive to said programmable master/slave indicator circuitry; a daisy chain state input; a bus for interfacing said synchronization controller with a swap controller in said first computer graphics pipeline; and a drawing output responsive to said bus for indicating whether said first computer graphics pipeline is ready to swap its frame buffers;

wherein: said daisy chain input is coupled to said daisy chain state input and to one input of said AND gate; the output of said OR gate is coupled to said daisy chain output; said drawing output is coupled to one input of said OR gate; the output of said AND gate is coupled to another input of said OR gate; and said master/slave output is coupled to another input of said AND gate so as to gate said daisy chain input to said OR gate when said synchronization control system is programmed as a slave, but to inhibit said daisy chain input from reaching said OR gate when said synchronization control system is programmed as a master.

9. The method or claim 6, further comprising the steps of:

responsive to the result of said determining step, propagating the state of said daisy chain input signal to a subsequent computer graphics pipeline in said daisy chained series.

10. A method of synchronizing frame buffer swapping in multi-pipeline computer graphics display systems, comprising the steps of: in a master computer graphics pipeline:

a) swapping buffers;

b) asserting a master drawing signal;

c) communicating the master drawing signal to a slave computer graphics pipeline;

d) unasserting the master drawing signal;

e) waiting until a slave status signal indicates that the slave computer graphics pipeline is ready to swap buffers; and f) beginning again at step a).

11. The method of claim 10, further comprising the steps of: in the stave computer graphics pipeline:

g) waiting until a daisy chain input signal is asserted;

h) swapping buffers, i) asserting a slave drawing signal;

j) generating the slave status signal responsive to the logical OR of the daisy chain input signal and the slave drawing signal;

k) communicating the slave status signal to the master computer graphics pipeline;

l) unasserting the slave drawing signal; and m) beginning again at step g).

12. The method of claim 10, wherein step a) is only performed when the raster of the master computer graphics pipeline is not in a window of interest.

13. The method of claim 11, wherein step h) is only performed when the raster of the slave computer graphics pipeline is not in a window of interest.

* * * * *

UNITED STATES PATENT AND TRADEMARK OFFICE
CERTIFICATE OF CORRECTION

PATENT NO.    : 6,157,395
DATED         : December 5, 2000
INVENTOR(S)   : Byron A. Alcorn It is certified that error appears in the above-identified patent and that said Letters Patent is hereby corrected as shown below:

Column 9,
Line 3, after "method" delete "or" and insert therefor -- of --

Signed and Sealed this

Fourteenth Day of January, 2003

JAMES E. ROGAN
*Director of the United States Patent and Trademark Office*